US 8,368,903 B2

(12) United States Patent
Takaki

(10) Patent No.: US 8,368,903 B2
(45) Date of Patent: Feb. 5, 2013

(54) IMAGE FORMING APPARATUS

(75) Inventor: Kouichi Takaki, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 490 days.

(21) Appl. No.: 12/632,346

(22) Filed: Dec. 7, 2009

(65) Prior Publication Data

US 2010/0141975 A1   Jun. 10, 2010

(30) Foreign Application Priority Data

Dec. 10, 2008   (JP) .................................. 2008-314266

(51) Int. Cl.
*G06K 15/02* (2006.01)
(52) U.S. Cl. ...... 358/1.12; 358/1.5; 358/1.18; 358/1.17; 271/3.21; 271/286; 399/372; 399/49; 399/68; 399/154; 399/301; 399/72
(58) Field of Classification Search .......................... None
See application file for complete search history.

(56) References Cited

U.S. PATENT DOCUMENTS

| | | | | |
|---|---|---|---|---|
| 4,849,829 | A * | 7/1989 | Maruyama et al. | 358/451 |
| 5,023,708 | A * | 6/1991 | Maruyama et al. | 358/540 |
| 5,130,791 | A * | 7/1992 | Abe | 358/518 |
| 5,627,649 | A * | 5/1997 | Sawayama et al. | 358/296 |
| 7,324,769 | B2 * | 1/2008 | Yamaoka | 399/49 |
| 7,689,138 | B2 * | 3/2010 | Tanaka | 399/75 |
| 7,773,897 | B2 * | 8/2010 | Tamaoki | 399/49 |
| 7,841,589 | B2 * | 11/2010 | Kawata | 270/58.12 |
| 8,020,859 | B2 * | 9/2011 | deJong et al. | 271/228 |
| 8,179,569 | B2 * | 5/2012 | Kageyama et al. | 358/1.9 |
| 2006/0187474 | A1 * | 8/2006 | Takaki | 358/1.9 |
| 2007/0019220 | A1 * | 1/2007 | Miyazaki et al. | 358/1.12 |
| 2007/0291291 | A1 * | 12/2007 | Vilar et al. | 358/1.9 |
| 2008/0038004 | A1 * | 2/2008 | Inoue | 399/45 |
| 2008/0292338 | A1 * | 11/2008 | Fujiwara | 399/44 |
| 2008/0317533 | A1 * | 12/2008 | Inoue | 399/401 |
| 2009/0091773 | A1 * | 4/2009 | Kushida | 358/1.12 |

FOREIGN PATENT DOCUMENTS

| | | |
|---|---|---|
| JP | 5-241390 | 9/1993 |
| JP | 2005-289035 | 10/2005 |
| JP | 2007-316237 | 12/2007 |
| JP | 2007316237 A * | 12/2007 |

\* cited by examiner

*Primary Examiner* — King Poon
*Assistant Examiner* — Ted Barnes
(74) *Attorney, Agent, or Firm* — Finnegan, Henderson, Farabow, Garrett & Dunner, L.L.P.

(57) ABSTRACT

An image forming apparatus including a control section which detects an offset of a recording sheet being conveyed, the offset being in a main scanning direction perpendicular to a conveyance direction of the recording sheet; performs an offset regulation control which adjusts a main scanning direction image area signal in accordance with the offset; and forms a patch at a non-transfer area on an image carrier, wherein the control section performs a first control based on the offset of the recording sheet for the offset regulation control while a sub scanning direction image area signal is active for image forming on the recording sheet, and performs a second control for the offset regulation control while the image area signal in the sub scanning direction is inactive.

6 Claims, 9 Drawing Sheets

IMAGE FORMING APPARATUS

CROSS REFERENCE TO RELATED APPLICATION

This application is based on Japanese Patent Application No. 2008-314266 filed on Dec. 10, 2008 at the Japanese Patent Office, the entire content of which is hereby incorporated by reference.

BACKGROUND OF THE INVENTION

1. Field of Technology

The present invention relates to an image forming apparatus such as a photocopier and printer, particularly to an image forming apparatus that uses a sensor to detect the patch density formed on a recording sheet and to control the image forming conditions, and provides offset regulation control of shifting an image formation area in response to the offset during conveyance of the recording sheet.

2. Description of Related Art

One of the conventional apparatuses includes an image forming apparatus that forms an image by the steps of:

forming an electrostatic latent image on an image carrier in conformity to image data;

generating a developed image (toner image) by developing the electrostatic latent image using developer (toner);

transferring the generated toner image from the image carrier to a recording sheet (recording sheet) by the transfer current from a transfer device;

separating the recording sheet from the image carrier by the separation current from a separation device; and using heat and pressure to fix the recording sheet carrying the toner image.

In such an image forming apparatus, an image of approximate density is obtained by controlling various forms of parameters under the image forming conditions. One of image forming conditions is the transfer condition. To be more specific, the transfer current is supplied to the image carrier and recording sheet from a transfer device and the toner image is transferred to the recording sheet. The percentage of the toner transferred to the recording sheet varies according to the value of the transfer current. The transfer efficiency is also known to vary in conformity to the size, thickness and material of the recording sheet, temperature, humidity, the amount of charge of toner on a photoreceptor, the amount of deposited toner, the contamination of the transfer device, the amount of water contained in the recording sheet, the degree of adhesion between the recording sheet and photoreceptor, the rotating speed of the photoreceptor, recording sheet conveyance speed and other factors. These various conditions must be taken into account before making adjustments. However, it is difficult to make adjustments to ensure the optimum transfer current value.

Thus, Japanese Unexamined Patent Application Publication No. H5-241390 to be described below discloses the technique wherein the toner image (patch) in conformity to the image data of a predetermined density is formed on the recording sheet, the density of the toner image on the recording sheet is measured, and the transfer current is corrected in conformity to the difference between the density estimated from the image data and the actually measured density.

For such a patch, the patch on the image carrier is read by a sensor using the non-transfer area on the image carrier, i.e., the space between the images to be transferred in the process of image formation, whereby the real-time implementation is possible in the process of image formation. This arrangement improves productivity without having to suspend image production. This type of technique is also disclosed in the Japanese Unexamined Patent Application Publication No. 2005-289035.

Further, the Japanese Unexamined Patent Application Publication No. 2007-316237 discloses the technique of automatically detecting the position for forming the above-mentioned patch and correcting the position for forming the patch.

Another apparatus in the conventional art is an image forming apparatus that provides offset regulation control in such a way that the offset in the direction perpendicular to the direction of the recording sheet being conveyed (the main scanning direction) is detected during recording sheet conveyance, and the image formation area on the image carrier is shifted in response to the offset. Thus, even if the recording sheet is conveyed by such an offset regulation control with the recording sheet being offset in the conveyance mode, an image will be transferred at a desired position.

Starting from the leading-edge of the image formation area for the recording sheet when an offset has occurred, the offset regulation control is performed continuously up to the leading edge of the image formation area of the recording sheet where a different offset has occurred, including the non-image formation area.

Still another apparatus in the conventional art is an image forming apparatus wherein, as described above, various forms of predetermined patches such as a density patch or registration mark are formed on the non-image area of the image carrier, and various forms of patches on this image carrier are read by a sensor, whereby the above-mentioned image forming conditions are controlled.

The inventors of the present application have found out in the above-mentioned case that, when the patch forming position is changed to the direction of main scanning by the aforementioned offset regulation control, the patch on the image carrier cannot be detected by the sensor if the patch is formed in finer patterns.

For example, in FIGS. 8 and 9, both the transfer area and the non-transfer area including the patch before the next transfer area starts are shifted to the right of the drawings by the offset regulation control on the Nth page.

In a similar manner, in FIGS. 8 and 9, both the transfer area and the non-transfer area including the patch are shifted to the left of the drawings by the offset regulation control on N+1th page until the next transfer area starts.

To put it another way, in FIG. 9, the transfer area and the non-transfer area immediately thereafter are in the same direction indicated by the broken line. This suggests that the same offset regulation control is performed in the transfer area and the non-transfer area immediately thereafter.

Since the shift in the transfer area agrees with the offset of the recording sheet, the relative misalignment is cancelled. Thus, an image free of misalignment is formed on the recording sheet. In the meantime, if the patch on the image carrier in the non-transfer area is shifted, positional misalignment occurs with respect to the sensor at the fixed position. This leads to the inability of reading a patch.

In view of the problems described above, it is an object of the present invention to provide an image forming apparatus capable of ensuring compatibility between the control of image forming conditions using a patch and offset regulation control conforming to the recording sheet offset.

SUMMARY OF THE INVENTION

One aspect of the present invention is an image forming apparatus comprising a control section which detects an offset of a recording sheet being conveyed, the offset being in a main scanning direction perpendicular to a conveyance direction of the recording sheet; performs an offset regulation control which adjusts a main scanning direction image area signal which represents an image area in the main scanning direction in accordance with the offset; forms a patch at a non-transfer area where image to be transferred to the recording sheet is not formed on an image carrier; and controls an image forming condition by reading the patch by a sensor, wherein the control section performs a first control based on the offset of the recording sheet for the offset regulation control while a sub scanning direction image area signal which represents an image area in a sub scanning direction perpendicular to the main scanning direction is active for image forming on the recording sheet, and performs a second control for the offset regulation control while the sub scanning direction image area signal is inactive.

Another aspect of the present invention is an image forming apparatus comprising a control section which detects an offset of a recording sheet being conveyed in a main scanning direction perpendicular to a conveyance direction of the recording sheet; performs an offset regulation control which adjusts a main scanning direction image area signal which represents an image area in the main scanning direction in accordance with the offset; forms a patch at a non-transfer area where image to be transferred to the recording sheet is not formed on an image carrier; and controls an image forming condition by reading the patch by a sensor, wherein the control section performs a first control based on the offset of the recording sheet for the offset regulation control at an image transferring area where image is transferred to the image recording sheet, and performs a second control for the offset regulation control at the non-transfer area.

Another aspect of the present invention is an image forming apparatus comprising a control section which detects an offset of a recording sheet being conveyed in a main scanning direction perpendicular to a conveyance direction of the recording sheet; performs an offset regulation control which adjusts a main scanning direction image area signal which represents an image area in the main scanning direction in accordance with the offset; forms a patch at a non-transfer area where image to be transferred to the recording sheet is not formed on an image carrier; and controls an image forming condition by reading the patch by a sensor, wherein the control section performs a first control based on the offset of the recording sheet for the offset regulation control while a sub scanning direction image area signal which represents an image area in a sub scanning direction perpendicular to the main scanning direction is active for image forming on the recording sheet, and performs a second control for the offset regulation control while a patch area signal which represents a patch forming area is active at the non-transfer area.

DETAILED DESCRIPTION OF THE PREFERRED EMBODIMENTS

Figure 1:
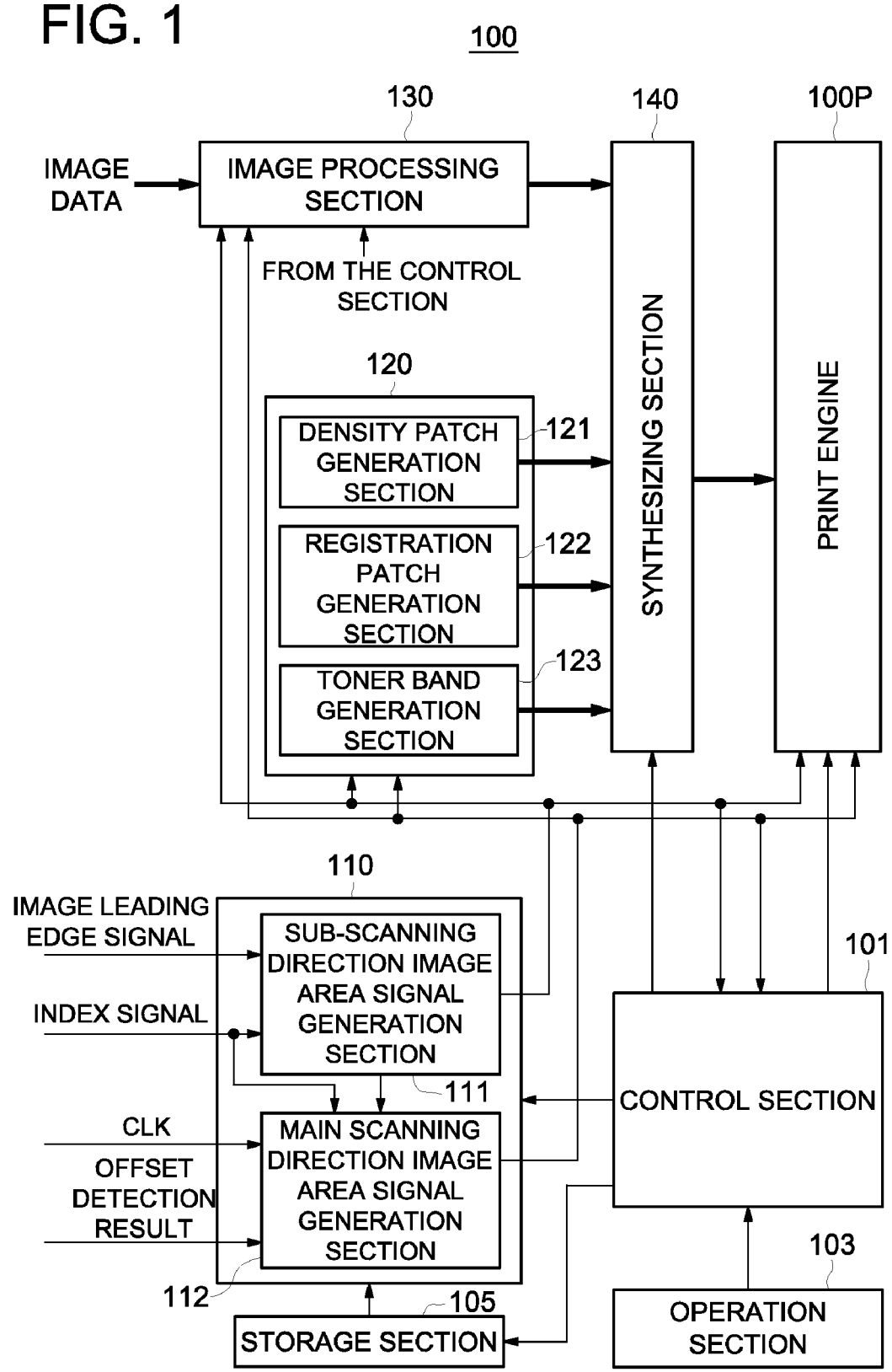
FIG. 1 is a schematic diagram representing the configuration of the image forming apparatus as an embodiment of the present invention.

Referring to the drawings, the following describes the preferred form of an embodiment for the implementation of the present invention:

Configuration of First Embodiment 1

The following describes the configuration of the image forming apparatus 100 as the first embodiment with reference to FIG. 1 (block diagram).

The following does not include the description of the general portions of the already known image forming apparatus which are not directly related to the operation or control characteristic of the present embodiment.

It should be noted that, in the present embodiment, the sub-scanning direction is defined as the direction wherein an image carrier is moved and a recording sheet is conveyed, and the main scanning direction is defined as the direction perpendicular to the sub-scanning direction. The recording sheet is conveyed in the sub-scanning direction and the image carrier is moved in the sub-scanning direction. Concurrently with this process, a two-dimensional image is formed by exposure on the image carrier in the main scanning direction, and the image on the image carrier is transferred onto the recording sheet, whereby a desired image is formed on the recording sheet.

In the image forming apparatus 100, the control section 101 is composed of a CPU and others in order to control various portions of the image forming apparatus 100. The control section 101 at least implements:

the control of forming a patch in the non-transfer area on the image carrier, reading the patch by a sensor, and adjusting the image forming conditions;

the offset regulation control of detecting the offset of the conveyed recording sheet in the main scanning direction and regulating the image area signal in the main scanning direction; and the control of ensuring compatibility between the image forming conditions control and offset regulation control.

An operation section 103 is used for various forms of operation inputs by the operator of the image forming apparatus, and is provided with various switches and keys.

A storage section 105 is a storage device for storing various forms of data. In this embodiment, the storage section 105 stores the density and pattern of the patch used in the control of image conditions, patch formation position, and various forms of data for control.

The image area signal generation section 110 includes the sub-scanning direction image area signal generation section 111 for generating a sub-scanning direction image area signal (V-Valid) that shows the sub-scanning direction in the image formation area on the image carrier; and the main scanning direction image area signal generation section 112 for generating the main scanning direction image area signal (H-Valid) showing the main scanning direction in the image formation area on the image carrier.

In this embodiment, the area on the image carrier, wherein both the main scanning direction image area signal and sub-scanning direction image area signal are active, indicates the "transfer area", wherein an image is transferred onto the recording sheet. That is, the "transfer area" is an area where image to be transferred to the image recording sheet is formed on the image carrier.

Further, in this embodiment, the area on the image carrier wherein at least one of the main scanning direction image area signal and sub-scanning direction image area signal is inactive indicates the "non-transfer area" wherein an image is not transferred onto the recording sheet. That is, the "non-transfer area" is an area where image to be transferred to the image recording sheet is not formed on the image carrier.

The patch generation section 120 is a patch image generation device for generating the images of various forms of patches in the non-transfer area of the image carrier. In this embodiment, the patch generation section 120 includes:

a density patch generation section 121 for generating the density patch for density adjustments;

a registration patch generation section 122 for generating the registration patch for registration adjustments; and a toner band generation section 123 for generating a toner band patch.

An image processing section 130 performs image processing wherein the image data for forming an image is converted into the form suitable for image formation.

A synthesizing section 140 is a data synthesizing section that receives the patch image from the patch generation section 120 and image data from the image processing section 130, and supplies the same to the print engine 100P.

Figure 2:
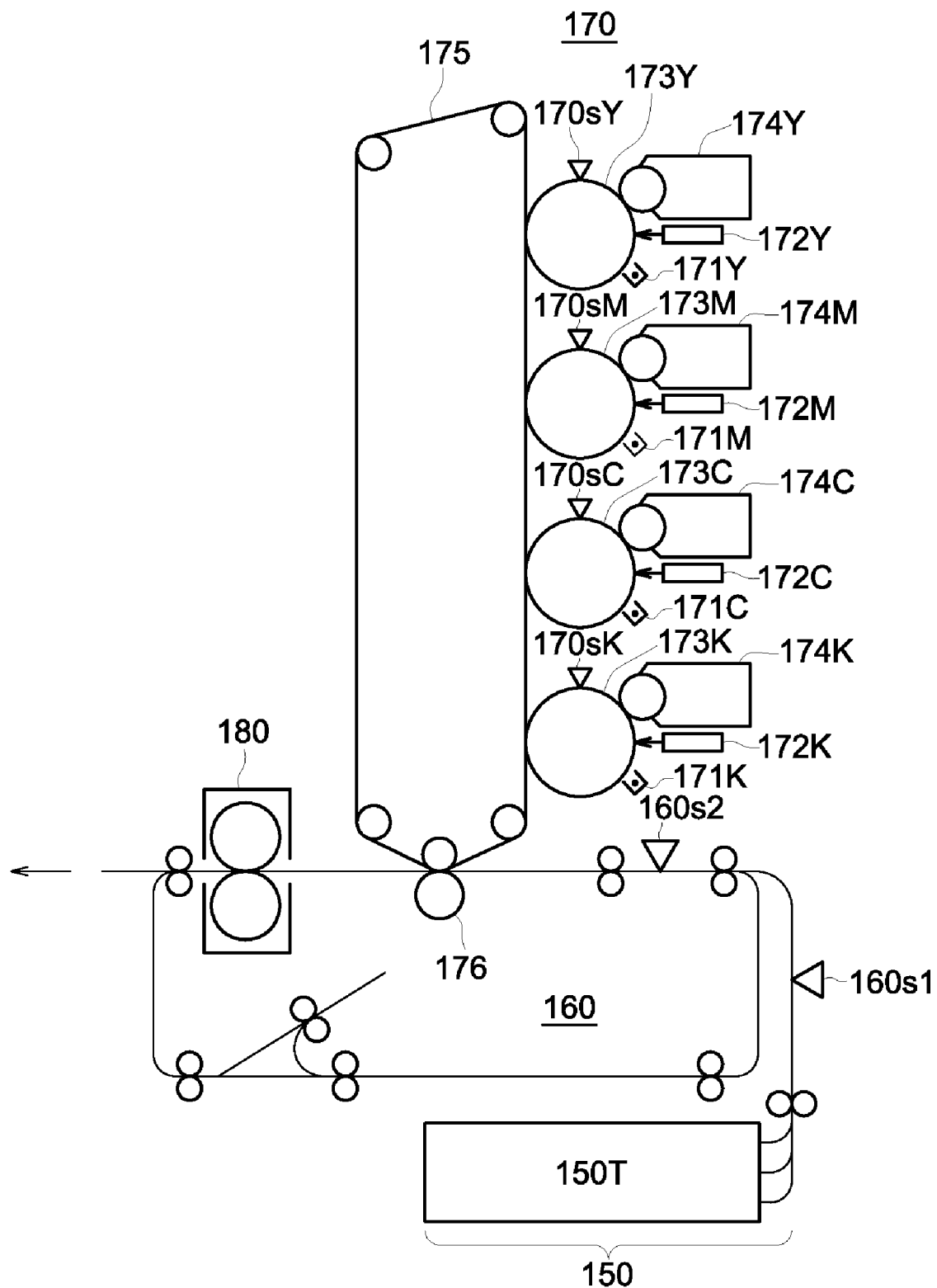
FIG. 2 is a schematic diagram representing the configuration of the image forming apparatus as an embodiment of the present invention.

Referring to FIG. 2, the following describes the configuration of the print engine 100P. The sheet supply section 150 is a sheet supply device for ensuring that the recording sheets placed on a plurality of sheet supply trays 150T are fed to the image formation position by a sheet supply roller.

The conveyance section 160 is a conveyance device for ensuring that the recording sheet fed out of the sheet supply section 150 is conveyed at a predetermined conveyance speed, and includes a registration roller, various forms of other conveyance rollers and a conveyance belt.

To detect the misalignment of the recording sheet fed out of the sheet supply section 150 in the main scanning direction (i.e., the longitudinal direction), the offset sensors 160s1, composed of the line sensors, are arranged at the outlet of the sheet supply section 150. Further, the conveyance sensors 160s2 such as leading-edge detection sensors for detecting the leading edge of a recording sheet are arranged at predetermined positions on various parts of the conveyance section 160.

The process unit 170 is a device for performing various forms of operations to form an image on the recording sheet, and includes a charging section 171 for charging the photoreceptor as specified, an exposure section 172 for exposing a photoreceptor in response to the image data, a photoreceptor 173 as an image carrier wherein an electrostatic latent image is formed by exposure, a development section 174 for developing the electrostatic latent image of the photoreceptor 173 and converting it into a toner image, an intermediate transfer member 175 as an image carrier wherein the toner image on the photoreceptor 173 is transferred and the image is carried thereby, and a transfer section 176 provided with a transfer roller 176a and a transfer roller 176b.

When the image forming apparatus is a color image forming apparatus wherein toner images of multiple colors are synthesized, the charging section 171, exposure section 172, photoreceptor 173, and development section 174 are provided for each color in the process unit 170, as shown in FIG. 2. Thus, the toner images of different colors are superimposed on the intermediate transfer member 175, and are transferred on the recording sheet in the final step.

The photoreceptors 173Y, 173M, 173C and 173K as image carriers are provided with sensors 170sY, 173sM, 173sC and 173sK for detecting the patch formed in the non-transfer area, respectively. It is also possible to arrange such a configuration so that patches are detected on the intermediate transfer member 175, although the photoreceptors are provided with sensors in this example.

While sandwiching and conveying the recording sheet with the toner image transferred thereon, the fixing section 180 uses heat and pressure to perform a fixing operation to ensure that the toner image is fixed onto the recording sheet.

Operation of the First Embodiment

Figure 3:
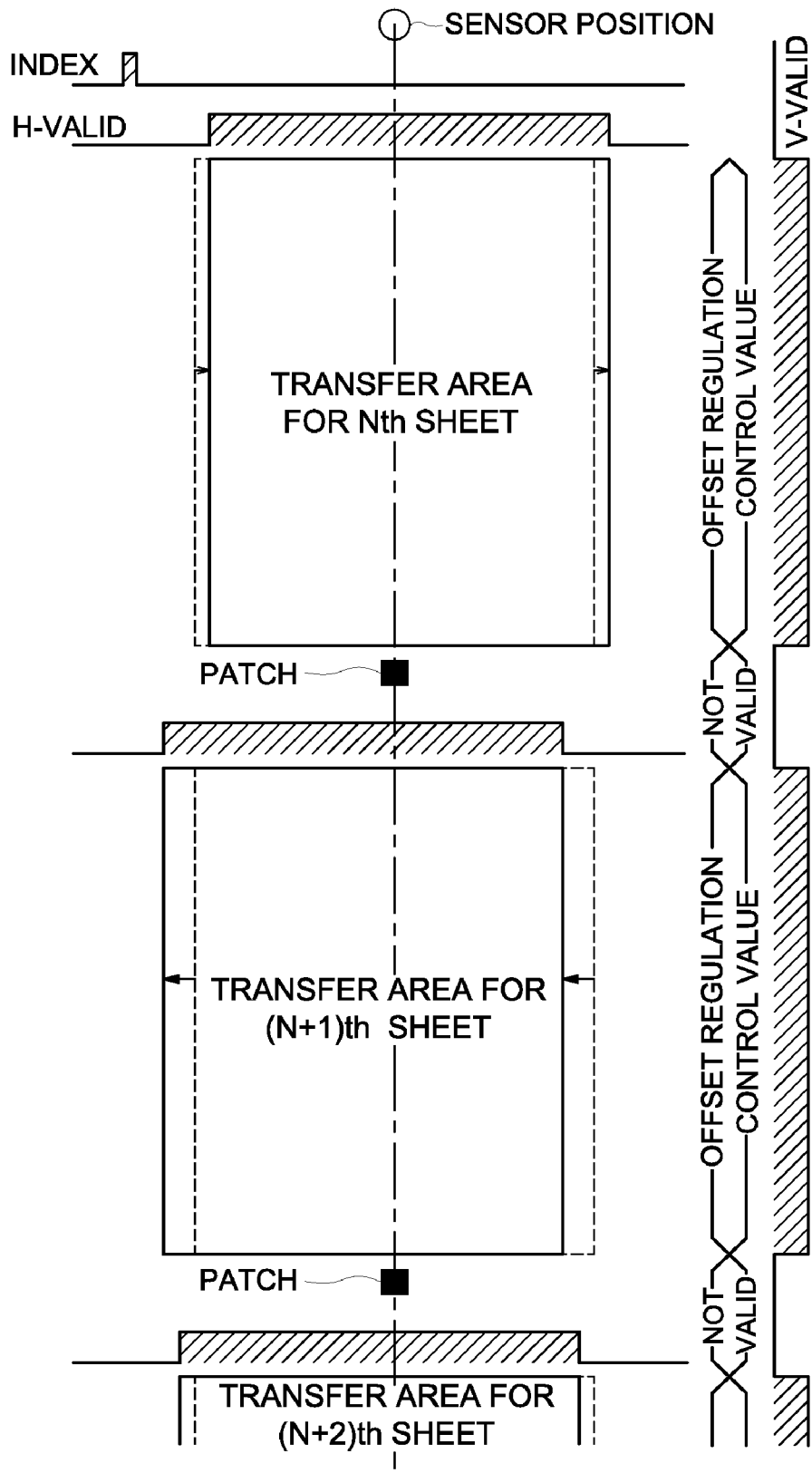
FIG. 3 is a schematic diagram representing the configuration of the image forming apparatus as an embodiment of the present invention.
Figure 4:
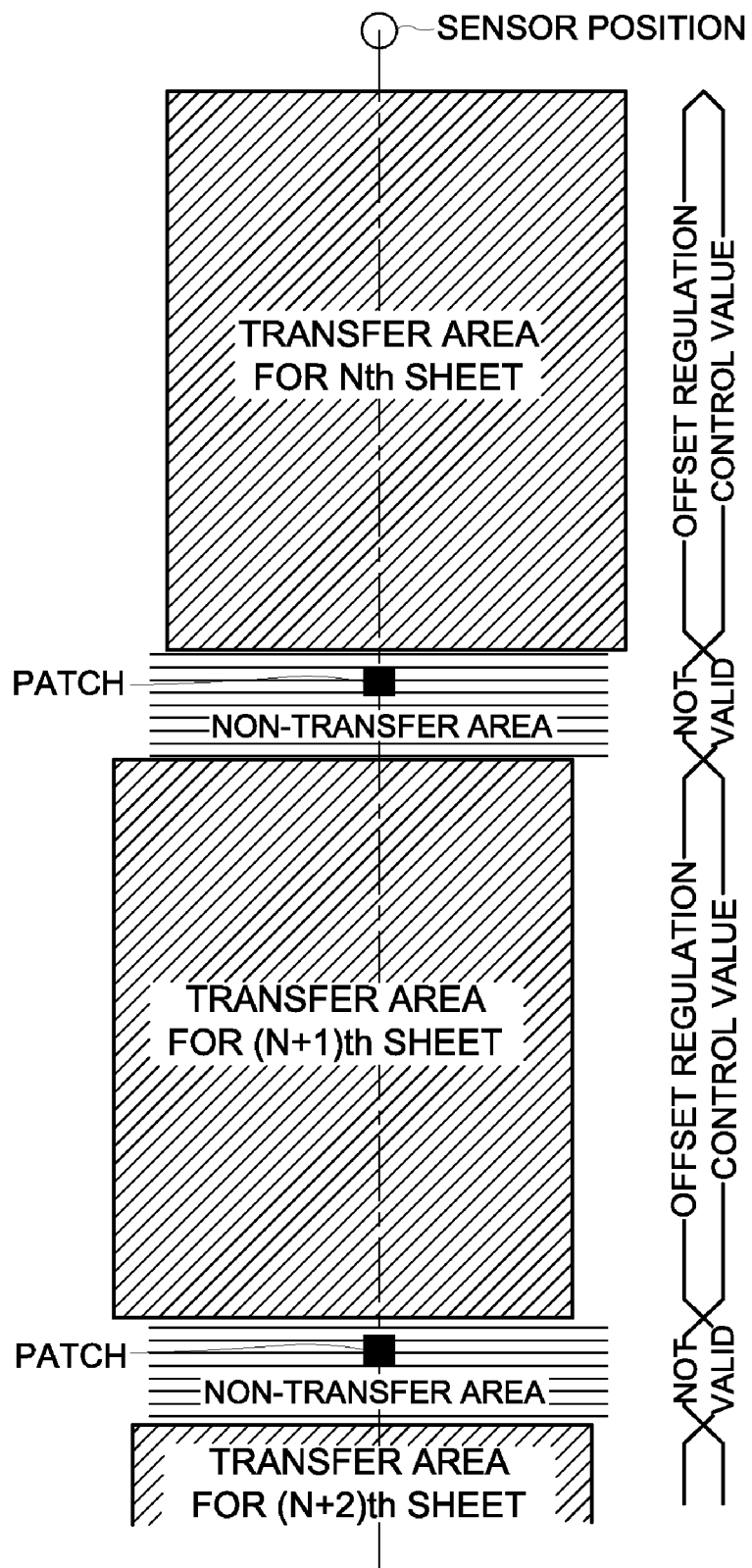
FIG. 4 is a schematic diagram representing the configuration of the image forming apparatus as an embodiment of the present invention.

Referring to the explanatory diagrams of FIGS. 3 and 4, the following describes the operations of the image forming apparatus in the first embodiment.

In the first embodiment, the control section 101 performs the offset regulation control to regulate the main scanning direction image area signal, when the offset sensor 160s1 has detected the offset of the recording sheet in the main scanning direction conveyed by the conveyance section 160. In this case, the main scanning direction image area signal generation section 112 which has received the instruction of performing the offset regulation control from the control section 101, accepts the index signal, pixel clock and the offset detection result, and generates the main scanning direction image area signal H-Valid in conformity to the offset during the conveyance of the recording sheet. In FIG. 3, the portion wherein the H-Valid is active is indicated by hatching. This ensures an image is formed (transferred) on the recording sheet without being affected by the offset at the time of conveyance.

Further, upon receipt of the instruction of generating a density patch for density adjustment, a registration patch for registration adjustment and a toner band patch from the control section 101 in the non-transfer area during the image formation process, the patch generation section 120 forms a patch in the non-transfer area on the photoreceptor 173. Then the patch is read by the sensor 170s. Based on the result having been obtained, the control section 101 controls the image forming conditions.

In FIG. 3, the portion wherein the V-Valid is active is indicated by hatching. To be more specific, offset regulation control is performed as usual in the transfer area wherein the V-Valid is active, whereas the offset regulation control is not performed in the non-transfer area wherein the V-Valid is inactive.

This ensures that the offset regulation control is performed only when the image is formed in the transfer area, and eliminates the possibility of the patch position being changed with offset regulation control. FIG. 4 uses the hatching of oblique lines to denote the transfer area wherein the offset regulation control is performed, and uses the hatching of horizontal lines to indicate the area around the patch (non-transfer patch area) which is the non-transfer area in a state where the offset regulation control is not performed.

In this case, the main scanning direction image area signal generation section 112 generates the main scanning direction image area signal H-Valid that causes the offset regulation control to be performed if the V-Valid is active. Further, the main scanning direction image area signal generation section 112 generates the main scanning direction image area signal H-Valid that does not cause the offset regulation control to be performed if the V-Valid is inactive.

In this case, the main scanning direction image area signal generation section 112 can be configured in such a way that, when the H-Valid is generated and outputted, the value of the register (not illustrated) in the image area signal generation section 112 is outputted after having been rewritten by software (software processing).

Alternatively, in this case, the main scanning direction image area signal generation section 112 can be configured in such a way that, when the H-Valid is generated and outputted, the value of the register (not illustrated) in the image area signal generation section 112 is outputted after having been rewritten by replacing the value stored in another register or storage section 105 (hardware processing).

This arrangement ensures compatibility between the control of the image forming conditions using a patch and offset regulation control conforming to the offset of the recording sheet.

Second Embodiment

The following describes the operation of the image forming apparatus of the second embodiment.

Figure 5:
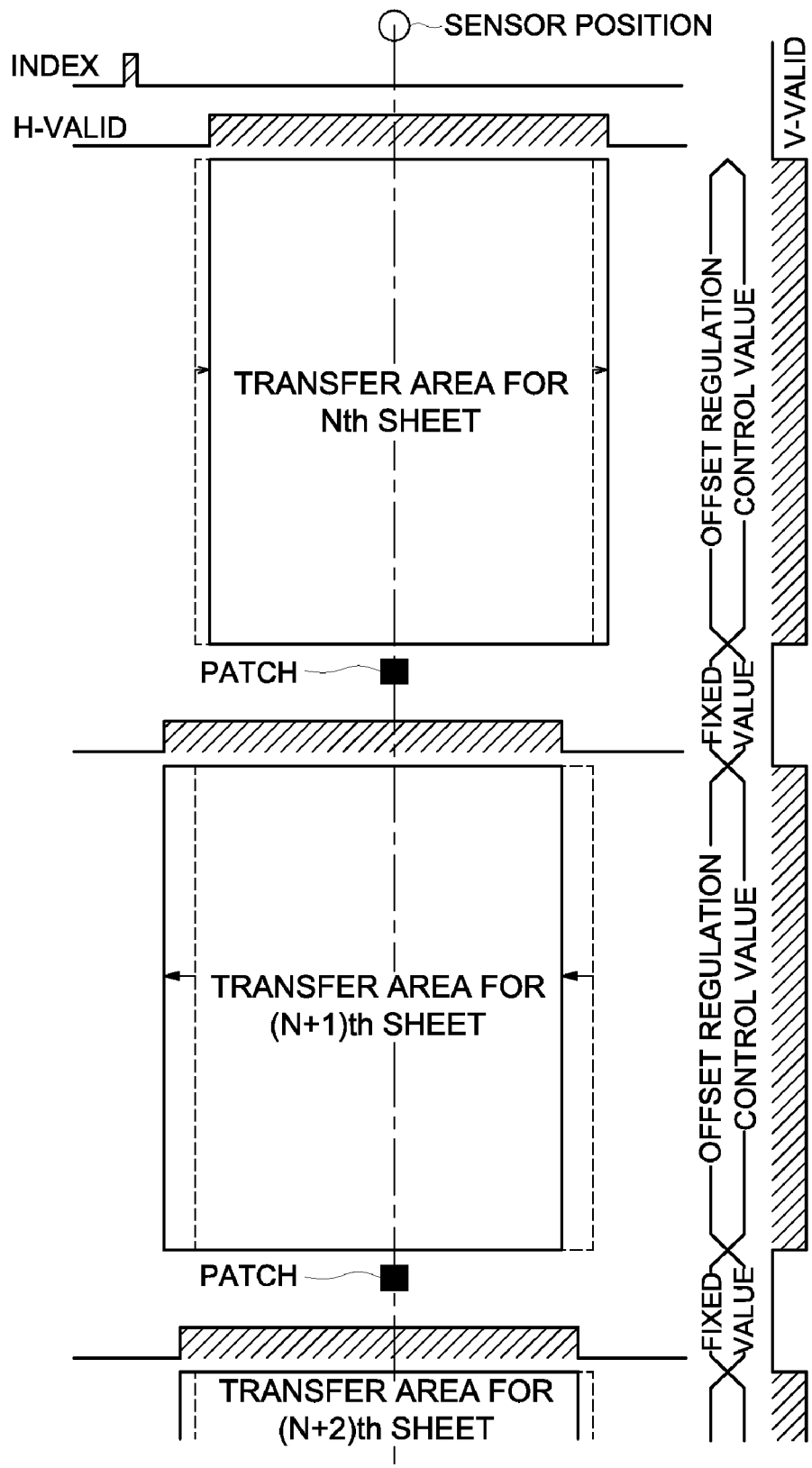
FIG. 5 is a schematic diagram representing the configuration of the image forming apparatus as an embodiment of the present invention.

In the second embodiment as well, similarly to the case of the first embodiment, the control section 101 performs the offset regulation control to regulate the main scanning direction image area signal, when the offset sensors 160$s$1 has detected the offset of the recording sheet in the main scanning direction conveyed by the conveyance section 160. In this case, having received the instruction of executing the offset regulation control from the control section 101, the main scanning direction image area signal generation section 112 accepts the index signal, pixel clock and offset detection result, and generates the main scanning direction image area signal H-Valid in conformity to the offset during the conveyance of the recording sheet. In FIG. 5, the portion wherein the H-Valid is active is indicated by hatching. This ensures an image is formed (transferred) on the recording sheet without being affected by the offset at the time of conveyance.

Further, upon receipt of the instruction of generating a density patch for density adjustment, a registration patch for registration adjustment and a toner band patch from the control section 101 in the non-transfer area during the image formation process, the patch generation section 120 forms a patch in the non-transfer area on the photoreceptor 173. Then the patch is read by the sensor 170$s$. Based on the result having been obtained, the control section 101 controls the image forming conditions.

In FIG. 5, the portion wherein the V-Valid is active is indicated by hatching. To be more specific, offset regulation control is performed as usual in the transfer area wherein the V-Valid is active.

In the non-transfer area wherein the V-value is inactive, the offset regulation control is performed according to a predetermined fixed value. The fixed value in this case can be the value corresponding to the state wherein the offset regulation control is not performed, or the value for forming the optimum patch.

This ensures that, except when an image is being formed in the transfer area, the offset regulation control is performed according to the value different from the offset detection result, and therefore, eliminates the possibility of the patch position being changed with offset regulation control.

In this case, the main scanning direction image area signal generation section 112 generates the main scanning direction image area signal H-Valid that causes the offset regulation control to be performed if the V-Valid is active. Further, the main scanning direction image area signal generation section 112 generates the main scanning direction image area signal H-Valid that does not cause the offset regulation control to be performed if the V-Valid is inactive.

In this case, the main scanning direction image area signal generation section 112 can be configured in such a way that, when the H-Valid is generated and outputted, the value of the register (not illustrated) in the image area signal generation section 112 is outputted after having been rewritten by software (software processing).

Alternatively, in this case, the main scanning direction image area signal generation section 112 can be configured in such a way that, when the H-Valid is generated and outputted, the value of the register (not illustrated) in the image area signal generation section 112 is outputted after having been rewritten by replacing the value with a value stored in another register or storage section 105 (hardware processing).

This arrangement ensures compatibility between the control of the image forming conditions using a patch and offset regulation control conforming to the offset of the recording sheet.

Third Embodiment

The following describes the operation of the image forming apparatus of the third embodiment.

Figure 6:
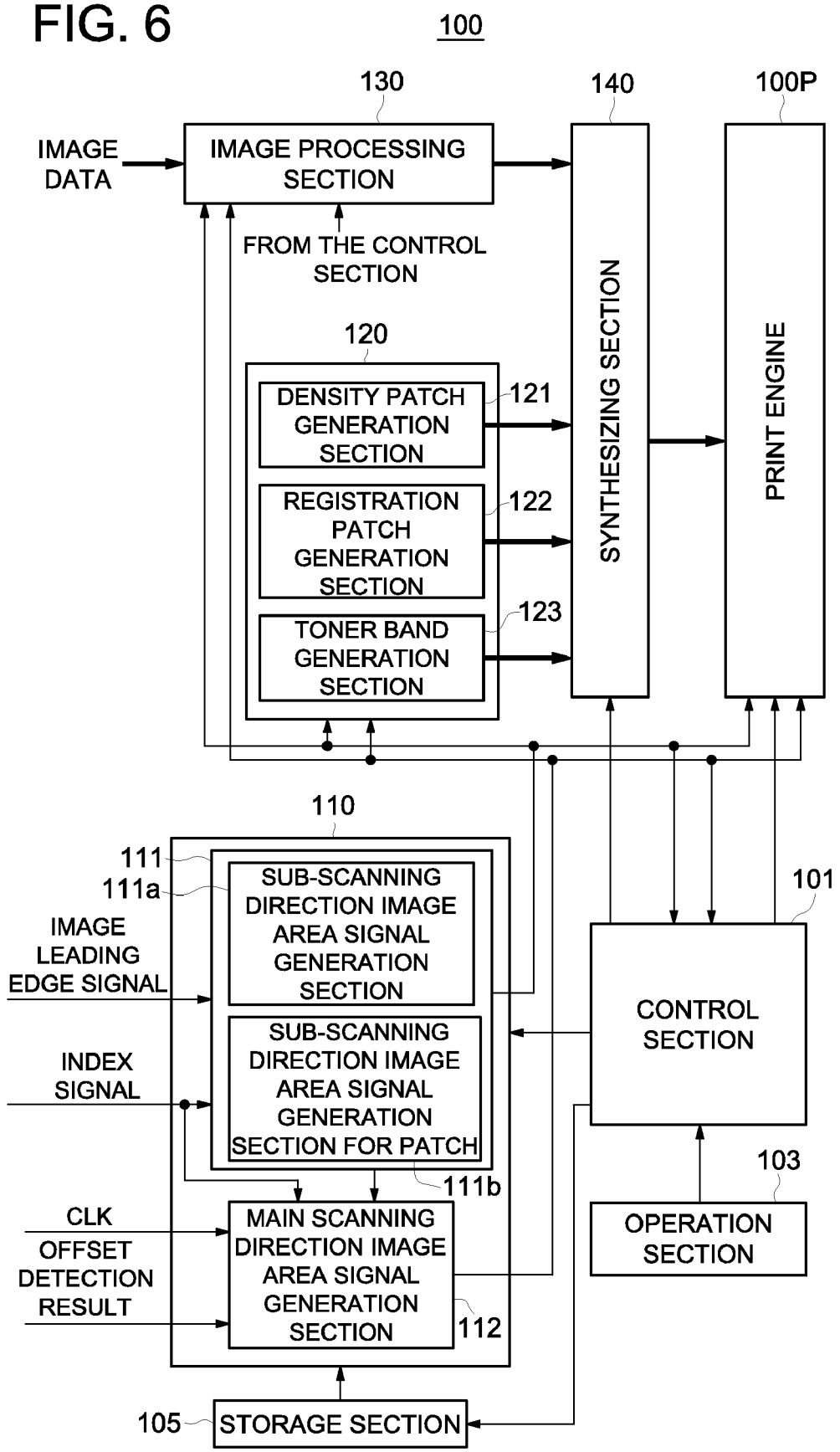
FIG. 6 is a schematic diagram representing the configuration of the image forming apparatus as an embodiment of the present invention.

In the third embodiment, the sub-scanning direction image area signal generation section 111 includes the sub-scanning direction image area signal generation section 111$a$ for generating the regular sub-scanning direction image area signal V-Valid, and the sub-scanning direction image area signal generation section 111$b$ for a patch that generates the sub-scanning direction image area signal V-Valid' for a patch, as before, as shown in the block diagram of FIG. 6. The sub-scanning direction image area signal generation section 111 of FIG. 1 can incorporate a similar structure.

In the third embodiment as well, similarly to the case of the first and second embodiments, the control section 101 performs the offset regulation control to regulate the main scanning direction image area signal, when the offset sensor 160$s$1 has detected the offset of the recording sheet in the main scanning direction conveyed by the conveyance section 160. In this case, having received the instruction of executing the offset regulation control from the control section 101, the main scanning direction image area signal generation section 112 accepts the index signal, pixel clock and offset detection result, and generates the main scanning direction image area signal H-Valid in conformity to the offset during the conveyance of the recording sheet.

Figure 7:
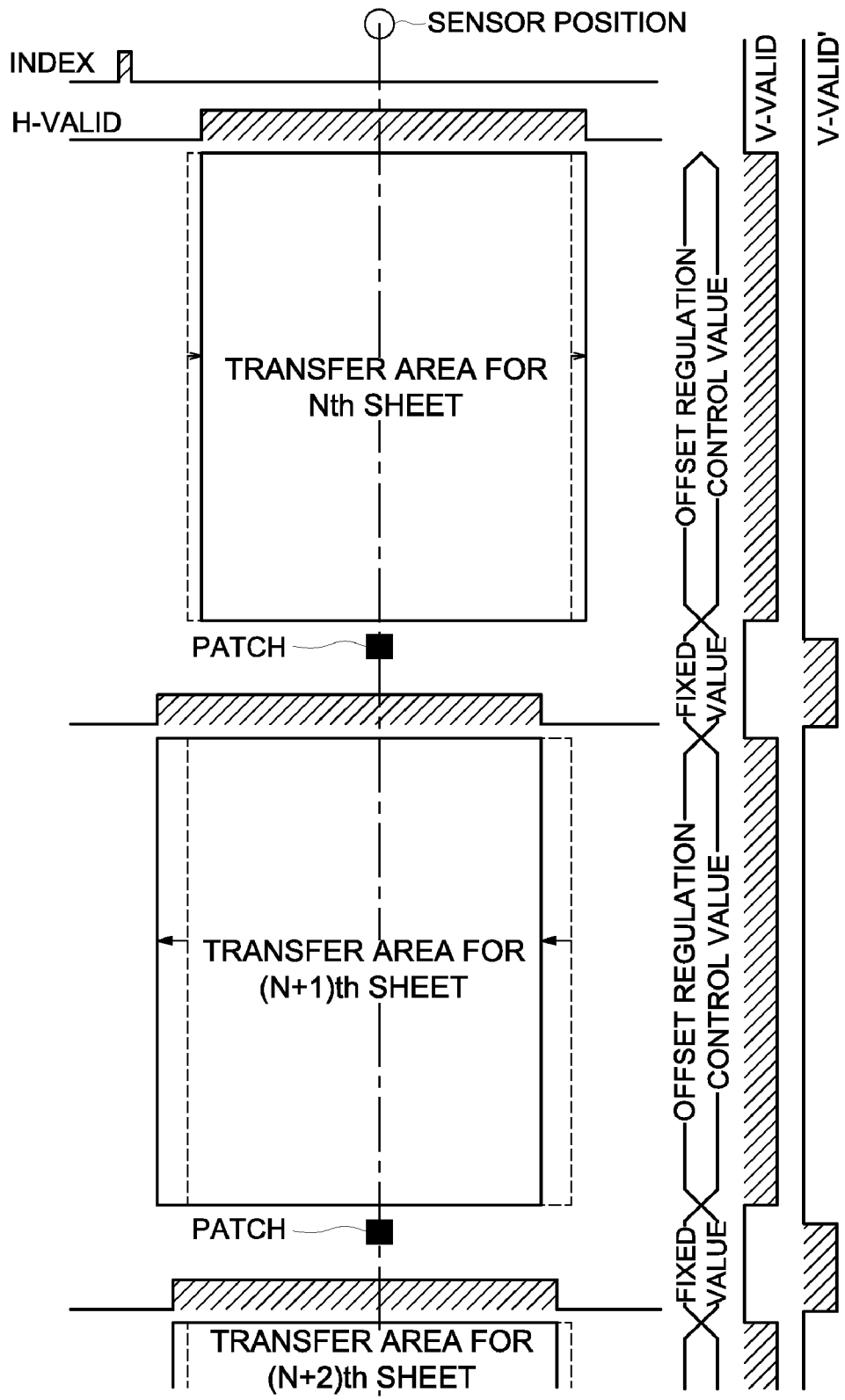
FIG. 7 is a schematic diagram representing the configuration of the image forming apparatus as an embodiment of the present invention.
Figure 8:
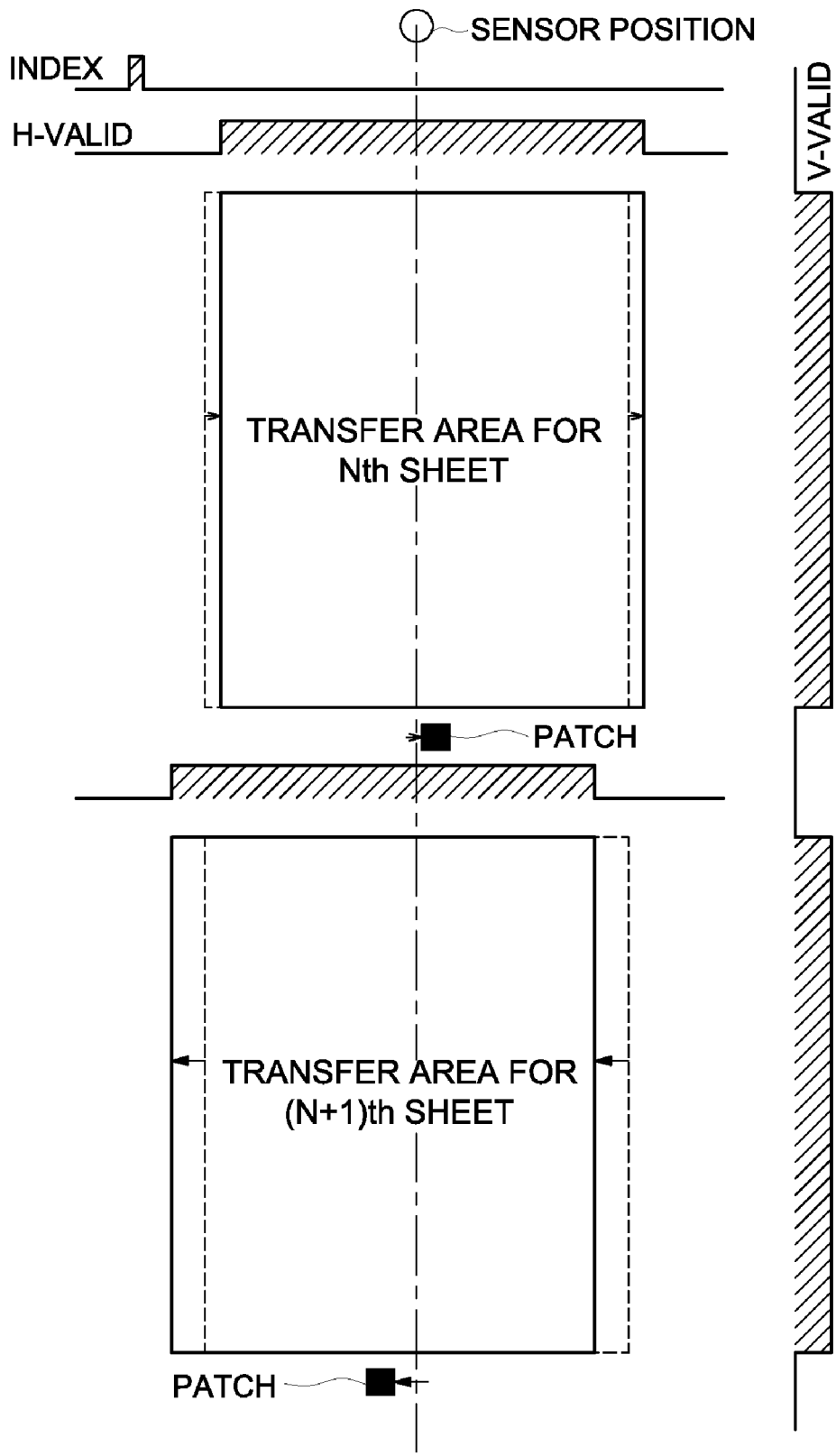
FIG. 8 is an explanatory diagram showing the conventional operations.
Figure 9:
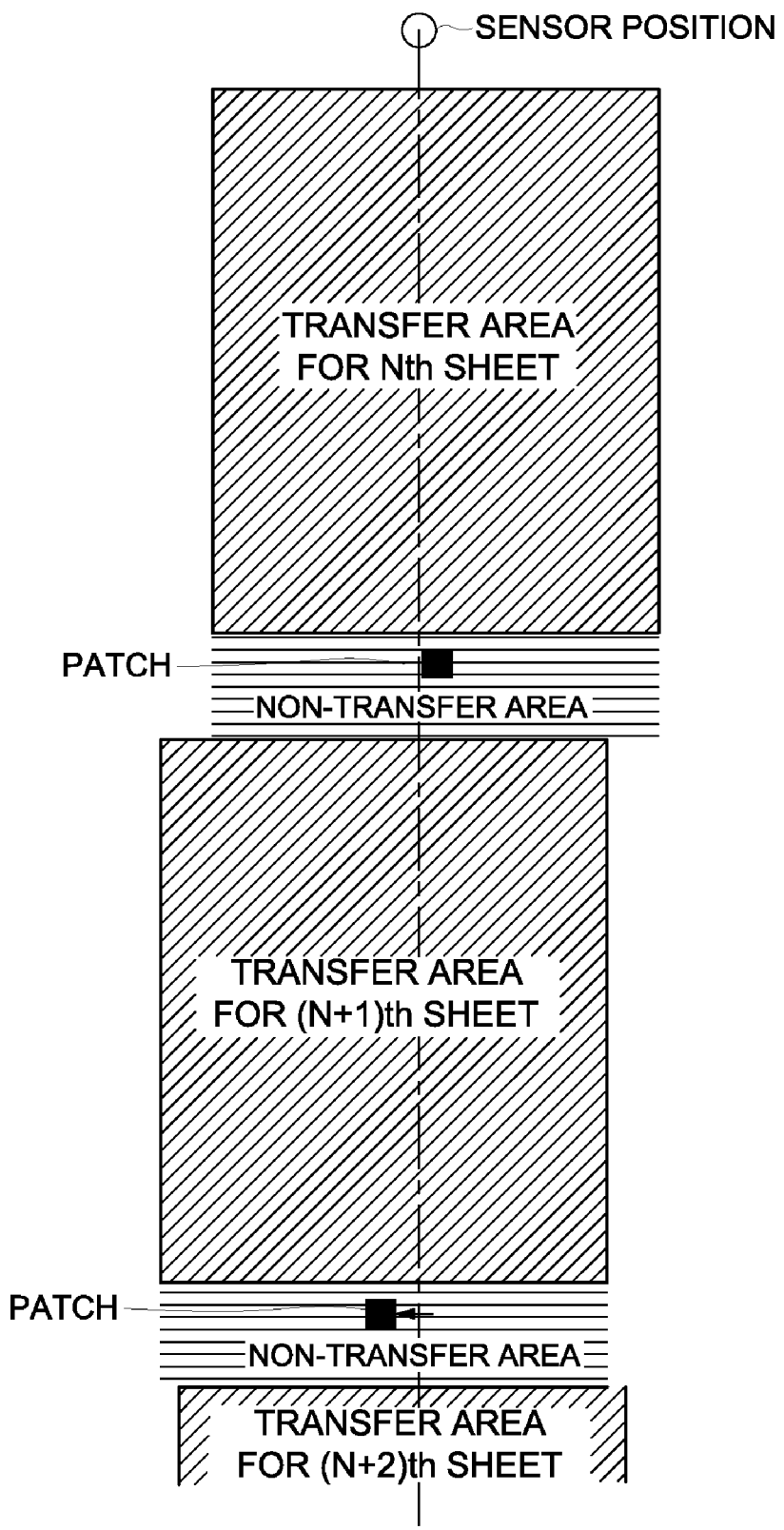
FIG. 9 is an explanatory diagram showing the conventional operations.

In FIG. 7, the portion wherein the H-Valid is active is indicated by hatching. This ensures an image is formed (transferred) on the recording sheet without being affected by the offset at the time of conveyance.

Further, upon receipt of the instruction of generating a density patch for density adjustment, a registration patch for registration adjustment and a toner band patch from the control section 101 in the non-transfer area during the image formation process, the patch generation section 120 forms a patch in the non-transfer area on the photoreceptor 173 when the sub-scanning direction image area signal V-Valid' for pitch is active. Then the patch is read by the sensor 170s. Based on the result having been obtained, the control section 101 controls the image forming conditions.

In FIG. 7, the portion wherein the V-Valid and V-Valid' are active is indicated by hatching. To be more specific, the offset regulation control is performed as usual in the transfer area wherein the V-Valid is active.

In the non-transfer area wherein the V-Valid' is active, the offset regulation control is not performed or is performed according to a predetermined fixed value. The fixed value in this case can be the value corresponding to the state wherein the offset regulation control is not performed, or the value for forming the optimum patch.

This ensures that, except when an image is being formed in the transfer area, offset regulation control is performed according to the value different from the offset detection result based on the sub-scanning direction image area signal V-Valid' for patches, and therefore, eliminates the possibility of the patch position being changed with offset regulation control.

In this case, the main scanning direction image area signal generation section 112 can be designed in such a way that, when the H-Valid is generated and outputted, the value of the register (not illustrated) in the image area signal generation section 112 is outputted after having been rewritten by software (software processing).

Alternatively, in this case, the main scanning direction image area signal generation section 112 can be designed in such a way that, when the H-Valid is generated and outputted, the value of the register (not illustrated) in the image area signal generation section 112 is outputted after having been rewritten by software (software processing) by replacing the value with a value stored in another register or storage section 105 (hardware processing).

This arrangement ensures compatibility between the control of the image forming conditions using a patch and offset regulation control conforming to the offset of the recording sheet.

Embodiment 4

In the aforementioned third embodiment, only one type of the sub-scanning direction image area signal V-Valid' for a patch was shown. In the presence of a plurality of patches such as a density patch, registration patch and toner band, density control or registration control can be performed in such a way that the sub-scanning direction image area signals V-Valid' (V-Valid', Valid", . . . ) for patches are prepared to conform to these patches, and the patches are formed according to these signals, respectively, without being affected by offset regulation control (or offset regulation control using a fixed value).

The aforementioned procedure can be performed when the sub-scanning direction image area signals V-Valid' for various forms of patches are overlapped. Even if overlap occurs in the sub-scanning direction, no problem arises since patches formed in the non-transfer area are positioned differently in the main scanning direction.

According to the present embodiment, the following advantages are obtained.

1. Except when an image is being formed in the transfer area, the offset regulation control is not performed. This eliminates the possibility of the patch position being changed with offset regulation control, and therefore, ensures compatibility between the control of the image forming conditions using a patch and offset regulation control conforming to the offset of the recording sheet.

2. Except when an image is being formed in the transfer area, the offset regulation control is performed with the amount of regulation different from that in the transfer area. This eliminates the possibility of the patch position being changed with offset regulation control, and therefore, ensures compatibility between the control of the image forming conditions using a patch and offset regulation control conforming to the offset of the recording sheet.

3. Means are provided to eliminate the possibility of the patch position being changed with offset regulation control on the regular recording sheet in the transfer area, and therefore, to ensure compatibility between the control of the image forming conditions using a patch and offset regulation control conforming to the offset of the recording sheet.

4. Means are provided to eliminate the possibility of the patch position being changed with offset regulation control on the regular recording sheet in the transfer area, and therefore, to ensure compatibility between the control of the image forming conditions using a patch and offset regulation control conforming to the offset of the recording sheet.

5. Means are provided to eliminate the possibility of the patch position being changed with offset regulation control on the regular recording sheet in the transfer area, and to ensure adequate adjustments are made according to the type of the patch; hence, to ensure compatibility between the control of the image forming conditions using a patch and offset regulation control conforming to the offset of the recording sheet.

What is claimed is:

1. An image forming apparatus comprising:
a control section which detects an offset of a recording sheet being conveyed, the offset being in a main scanning direction perpendicular to a conveyance direction of the recording sheet; performs an offset regulation control which adjusts a main scanning direction image area signal which represents an image area in the main scanning direction in accordance with the offset; forms a patch at a non-transfer area where an image to be transferred to the recording sheet is not formed on an image carrier; and controls an image forming condition by reading the patch by a sensor,
wherein the control section performs a first control which generates an adjusted main scanning direction image area signal for performing the offset regulation control based on the offset of the recording sheet, and forms the image to be transferred to the recording sheet at a transfer area on the image carrier in accordance with the adjusted main scanning direction image area signal while a sub scanning direction image area signal which represents an image area in a sub scanning direction perpendicular to the main scanning direction is active for image forming on the recording sheet, and wherein the control section performs a second control which generates a non-adjusted main scanning direction image area signal for which does not perform the offset regulation control, and forms the patch at the non-transfer area on the image carrier in accordance with the non-adjusted main scanning direction image area signal while the sub scanning direction image area signal is inactive.

2. The image forming apparatus of claim 1, wherein the second control is a control which invalidates the offset regulation control.

3. The image forming apparatus of claim 1, wherein the second control is a control which performs the offset regulation control based on an adjusting amount different from that of the first control.

4. The image forming apparatus of claim 1, wherein the second control is a control which performs the offset regulation control based on an adjusting amount of a fixed value.

5. The image forming apparatus of claim 1, wherein the patch comprises at least one of a density patch for density adjustments, a registration patch for registration adjustments and a toner band patch.

6. The image forming apparatus of claim 1, wherein the patch is formed at the non-transfer area between the image formed at the transfer area and a subsequent image to be formed subsequently at the transfer area on the image carrier.

* * * * *